US006549522B1

(12) United States Patent
Flynn

(10) Patent No.: US 6,549,522 B1
(45) Date of Patent: Apr. 15, 2003

(54) MOBILE DATA RATE ENHANCEMENT VIA FOREIGN AGENT LOAD BALANCING

(75) Inventor: Jason Stuart Flynn, Suffolk (GB)

(73) Assignee: British Telecommunications public limited Company, London (GB)

( * ) Notice: Subject to any disclaimer, the term of this patent is extended or adjusted under 35 U.S.C. 154(b) by 0 days.

(21) Appl. No.: 09/555,740

(22) PCT Filed: Dec. 11, 1998

(86) PCT No.: PCT/GB98/03711
§ 371 (c)(1),
(2), (4) Date: Jun. 5, 2000

(87) PCT Pub. No.: WO99/31853
PCT Pub. Date: Jun. 24, 1999

(30) Foreign Application Priority Data

Dec. 17, 1997 (EP) .............................................. 97310243
Dec. 17, 1997 (GB) .............................................. 9726643

(51) Int. Cl.[7] .................................................. H04Q 7/00
(52) U.S. Cl. ...................... 370/313; 370/389; 370/400; 709/239
(58) Field of Search ................................ 370/313, 389, 370/902, 912, 913, 351, 400, 229, 235, 236, 237, 238, 310; 709/226, 238, 239

(56) References Cited

U.S. PATENT DOCUMENTS

| 5,325,362 A | | 6/1994 | Aziz | |
|---|---|---|---|---|
| 5,680,548 A | | 10/1997 | Trugman | |
| 5,734,829 A | * | 3/1998 | Robinson | 395/200.35 |
| 5,825,759 A | * | 10/1998 | Liu | 370/331 |
| 5,870,460 A | * | 2/1999 | Litzenberger | 379/114 |
| 5,928,325 A | * | 7/1999 | Shaughnessy et al. | 709/206 |
| 6,144,671 A | * | 11/2000 | Perinpanathan et al. | 370/409 |
| 6,243,758 B1 | * | 6/2001 | Okanoue | 709/238 |

FOREIGN PATENT DOCUMENTS

| DE | 19618535 A1 | 7/1997 |
|---|---|---|
| EP | 0637801 A1 | 3/1995 |
| EP | 0748096 A2 | 12/1996 |
| WO | WO 96/21984 | 7/1996 |
| WO | WO 98/26621 | 6/1998 |

OTHER PUBLICATIONS

Johnson, "Ubiquitous Mobile Host Internetworking", Proceedings of the Workshop of Workstation Operating Systems, Oct. 14, 1993, pp. 85–90, XP000672247.

Myles et al, "Comparison of Mobile Host Protocols for IP", International Research and Experience, vol. 4, No. 4, Dec. 1993, pp. 175–194, XPO000672445.

Information Sciences Institute, University of Southern California: "Transmission Control Protocol", RFC793, Sep. 30, 1981, XP002069478.

Geiger, et al, "Wireless Network Extension Using Mobile IP", Digest of Papers of Compcon (Computer Society Conference) 1996, Technologies for the Information Superhighway Santa Clara, Fed. 25–28, 1996, No. Conf. 41, Feb. 25, 1996, pp. 9–14, XP000628459.

Kojo et al, "Efficient Transport Service for Slow Wireless Telephone Links", IEEE Journal on Selected Areas in Communications, vol. 15, No. 7, Sep. 1997, pp. 1337–1348 XP002065094.

* cited by examiner

*Primary Examiner*—Hassan Kizou
*Assistant Examiner*—Anh-Vu H Ly
(74) *Attorney, Agent, or Firm*—Nixon & Vanderhye P.C.

(57) ABSTRACT

Data is routed through the Internet to a mobile node by using home agents and foreign agents to provide mobility functions. Data transfer rates to the mobile node are improved by providing for transfer of data from the home agent to a plurality of foreign agents on a round-robin basis, which can be enhanced by checking the quality of the connection between the foreign agent and the mobile node and re-routing the data through another foreign agent if certain predetermined quality criteria are not met.

17 Claims, 3 Drawing Sheets

MOBILE DATA RATE ENHANCEMENT VIA FOREIGN AGENT LOAD BALANCING

RELATED APPLICATIONS

This application is related to my applications:

(1) Ser. No. 09/555,917 filed Jun. 6, 2000 entitled "PROXY ROUTING"

(2) Ser. No. 582,728 filed Jun. 30, 2000 entitled "COMMUNICATIONS SYSTEM"

BACKGROUND OF THE INVENTION

Field of the Invention

The present invention relates to the routing of data within communications networks, including but not confined to networks such as the Internet, and particularly, but not exclusively, to a method of routing data directed to a mobile node. The mobile node may be a mobile host, such as a portable computer, or it may be a router which is responsible for the mobility of one or more entire networks, for example, the mobile data network within an aircraft. In either case, the mobile node may change its point of attachment from one network or subnetwork to another.

Background

The routing of data around the diverse networks which make up the Internet is based on a protocol known as the Internet Protocol (IP). Data is transferred in the form of data units known as IP datagrams between points in the Internet specified by IP addresses. The use of IP hides the physical nature of the underlying networks from application processes running over the Internet. These networks may, for example, be a combination of wired and wireless local and wide area networks using different physical protocols such as Ethernet and token-ring, including networks linked by telephone through an Internet Service Provider (ISP), or through satellite or ground based radio or infrared links.

The detailed specification of IP is available in a "Request for Comments" document, RFC 791, maintained by the Internet Engineering Task Force (IETF). RFC documents are widely available on the Internet at, for example, "ftp://ds.internic.net/rfc/rfcxxxx.txt", where "xxxx" represents the RFC number, so that RFC 791 is available as rfc791.txt.

The current version of IP, known as IPv4, does not itself support mobility, but a protocol entitled "IP Mobility Support", commonly referred to as Mobile IP, has been designed to enhance IPv4 to support mobility. This protocol is described in document RFC 2002, available as detailed above. The use of Mobile IP to provide wireless network access for mobile computing users is described in "Wireless Network Extension Using Mobile IP", Digest of Papers of Compcon (Computer Society Conference) 1996, Technologies for the Information Superhighway Santa Clara, Feb. 25–28 1996, no. Conf. 41, Feb. 25, 1996, pages 9–14, XP000628459 Institute of Electrical and Electronics Engineers. The next generation of IP (IPv6) is being specifically designed to deal with the mobility requirement.

IPv4 assumes that a node's IP address uniquely identifies the node's fixed point of attachment to the Internet. If the node is transferred to a different point, it can only be contacted by allocating it a new IP address. Mobile IP, however, enables a mobile node, such as a laptop or palmtop computer, to send and receive IP datagrams over the Internet regardless of the physical location at which it is connected to the Internet and without changing its IP address; One example of the mechanism by which it does so is illustrated in FIGS. 1a and 1b.

Referring to FIG. 1a, the Internet comprises a large number of networks and sub-networks 1, 2, 3, 4 connected via routers 5. A router may be a general purpose computer programmed to perform routing tasks. Increasingly, routers throughout the Internet are dedicated pieces of hardware, controlled by software or firmware, provided by companies such as Cisco Systems, California, USA. In either case, the functionality of a router intended for use in an IP based network is defined in RFC 1812.

A mobile node (MN) 6 is normally connected to the Internet via a home network 1. The unique IP address assigned to the node 6 is known as its home address. Mobility agents, known as foreign agents (FA) and home agents (HA), advertise their presence on a network via availability messages known as Agent Advertisements. A mobility agent is typically a router connected to a particular network; for example, a home agent 7 is a router connected to the home network 1 and a foreign agent 8 is a router connected to a foreign network 2. The mobile node 6 may optionally solicit an Agent Advertisement message from, any local mobility agents via an Agent Solicitation message. By receiving Agent Advertisements, the mobile node 6 is able to determine whether it is on its home network 1 or on a foreign network 2, 3, 4.

While the mobile node 6 is on its home network, it has no need for mobility services. When the mobile node 6 is temporarily moved to a foreign network 2, as shown by the dotted box in FIG. 1a, it obtains a temporary care-of address on the foreign network 2. This can be a foreign agent care-of address, which is the IP address of the foreign agent, obtained by receiving or soliciting Agent Advertisements from any foreign agents based on the foreign network 2. Alternatively, the care-of address may be obtained by using an external assignment mechanism, such as Dynamic Host Configuration Protocol (DHCP) (the reader is referred to RFC 1541 for further information), in which case it is known as a co-located care-of address.

The mobile node 6 then registers its new care-of address with its home agent 7 by exchanging Registration Request and Registration Reply messages with it. Registration provides a mechanism by which mobile nodes can communicate their current reachability information to their home agent. The registration process is described in more detail below, assuming that the mobile node 6 on the foreign network 2 is registering a foreign agent care-of address received via an Agent Advertisement from, for example, foreign agent 8.

First, the mobile node 6 sends a Registration Request message to the foreign agent 8, which processes it and forwards it to the mobile node's home agent 7. The Registration Request message includes the IP address of the foreign agent. The home agent 7 sends a Registration Reply message to the foreign agent 8 granting (or denying) the registration request. The foreign agent 8 processes this Reply and forwards it to the mobile node 6. This process establishes a temporary address for the mobile node 6 to which datagrams can be delivered while the node is roaming away from its home network 1.

If the mobile node 6 is returning to its home network 1 having been on a foreign network 2, it deregisters with its home agent 7, through exchange of Registration Request and Registration Reply messages.

Referring to FIG. 1b, when a correspondent node (CN) 9 attached to a network 4 sends a message intended for the mobile node 6, while it is connected to the foreign network 2, the message is intercepted by the home agent 7, as shown by arrow A. The home agent 7 encapsulates the datagrams forming the message with the care-of address for the mobile node 6, in this example being the IP address of the foreign agent 8, and forwards the message to the foreign agent 8. The transmission of the encapsulated datagrams, shown by arrow B, is known as tunnelling. The foreign agent 8 receives the datagrams, decapsulates them and forwards them to the mobile node 6, as shown by arrow C. Messages from the mobile node 6 to other nodes in the Internet need not follow this route, but may be sent directly via an appropriate router, which may be foreign agent 8.

The concepts of encapsulation and tunnelling are described in detail in RFC 2003, "IP Encapsulation within IP". The model is that a tunnel is the path followed by a datagram while encapsulated. Encapsulation allows an IP datagram to be hidden from intermediate routers which would incorrectly attempt to route it to the mobile node. Instead, the datagram is routed between the encapsulator and a knowledgeable decapsulator, such as a foreign agent, which can correctly route the datagram. The home agent 7 and foreign agent 8 are known as the endpoints of the tunnel. In the case of the co-located care-of address, the mobile node itself acts as an endpoint of the tunnel.

To enable the tunnelling process described above to function correctly, the home agent 7 maintains reachability information for the mobile node 6, in a form known as a mobility binding. This is the association of the mobile node's identity with a care-of address and a parameter known as the Lifetime, which is the number of seconds remaining before the registration of the node 6 with the home agent 7 expires. The aim behind a Lifetime value is to maintain the dynamic nature of the system, with a binding expiring within a set time unless positively maintained by the mobile node 6. As an example, the default Router Advertisement Lifetime value, which may be used where a mobile node is registering with a foreign agent which it has acquired via an Agent Advertisement, is 1800 seconds.

On receipt of a Registration Request message, the home agent 7 creates or modifies the mobility binding, for example, by resetting the Lifetime value where the Request is a re-registration request and the mobility binding has not yet expired. If the Lifetime value for a given mobility binding expires before a re-registration request has been received, the home agent 7 deletes the mobility binding from its record. The Registration Reply message from the home agent 7 informs the mobile node 6 (via the foreign agent 8) of the status of its Request, including the Lifetime value allocated by the home agent 7.

Mobile IP supports multiple simultaneous mobility bindings, so that each mobile node 6 may register with a number of foreign agents and so obtain a number of care-of addresses. This is particularly useful where a mobile node using a wireless interface to a network, for example an RF interface, moves within range of more than one foreign agent. For example, if the mobile node is a router on an aircraft, then while the aircraft is in flight, the router may from time to time register with a series of foreign agents based on the ground below using a radio link.

In the case of multiple simultaneous mobility bindings, the home agent 7 retains its existing list of mobility bindings when it receives a Registration Request containing the IP address of a new foreign agent. If the Lifetime value of one mobility binding expires, the home agent 7 deletes that mobility binding from its record, but retains in its record the other non-expired bindings.

A problem with this method of data transmission arises when bandwidth bottlenecks occur in the forwarding of data from the home agent, either in the tunnelling routes or in the links between the foreign agents and the mobile node. For example, where the network links between the mobile node and the foreign agents are wireless links, these may have a substantially lower bandwidth than that available between the correspondent node and the home agent.

The primary role of the home agent and foreign agents is to provide the appropriate encapsulation and decapsulation to re-route data arriving at the mobile node's home network from a correspondent node, so as to reach the mobile node at its current location. The maximum data rate at which data can be received from the correspondent node without data loss is therefore limited to the data rate corresponding to the highest available bandwidth path between the home agent and mobile node.

KOJO M ET AL "An Efficient Transport Service for Slow Wireless Telephone Links" IEEE Journal on Selected Areas in Communications, vol. 15, no. 7, September 1997, pages 1337–1348, XP002065094 discloses a method of alleviating the problems encountered with the TCP/IP protocol over slow wireless links by providing an alternative protocol which transparently replaces the standard TCP/IP protocol over such links.

SUMMARY OF THE INVENTION

To address limitations on the data transfer rate to a mobile node, the present invention provides a method of routing data to a mobile node within a communications network, comprising the steps of determining the location of a plurality of agent nodes from which data can be transmitted to the mobile node; and transmitting successive data units from a stream of data units intended for the mobile node to different respective ones of the agent nodes.

Next successive ones of the data units may be transmitted to the agent nodes on a round robin basis.

Alternatively or in addition, data units may be transmitted to the agent nodes based on an assessment of the availability of each agent node or the quality of the connection between each agent node and the mobile node. The quality of the connection may be assessed in terms of available bandwidth or specifically by considering the level of buffer use at each agent node.

A datagram may be re-routed to a different agent node if the quality of the connection does not meet predetermined criteria, such as a minimum available bandwidth.

A method according to the present invention is capable of providing a virtual bandwidth channel which is the sum of the bandwidths of the individual channels available between the agent nodes and the mobile node.

According to the invention, there is further provided a communications system for mobile data transfer, comprising a mobile node connectable to a foreign network away from its home network, a home agent node associated with the home network for receiving a stream of data units intended for the mobile node, a plurality of foreign agent nodes associated with the foreign network for forwarding data units received from the home agent node to the mobile node, characterised in that the home agent node is configured to transmit successive data units from a received stream of data units to different respective ones of the foreign agent nodes.

BRIEF DESCRIPTION OF THE DRAWINGS

Embodiments of the invention will now be described by way of example with reference to the accompanying drawings, in which:

FIG. 3b is an example of a practical implementation of the system shown in FIG. 3a.

DETAILED DESCRIPTION

Figure 1A:
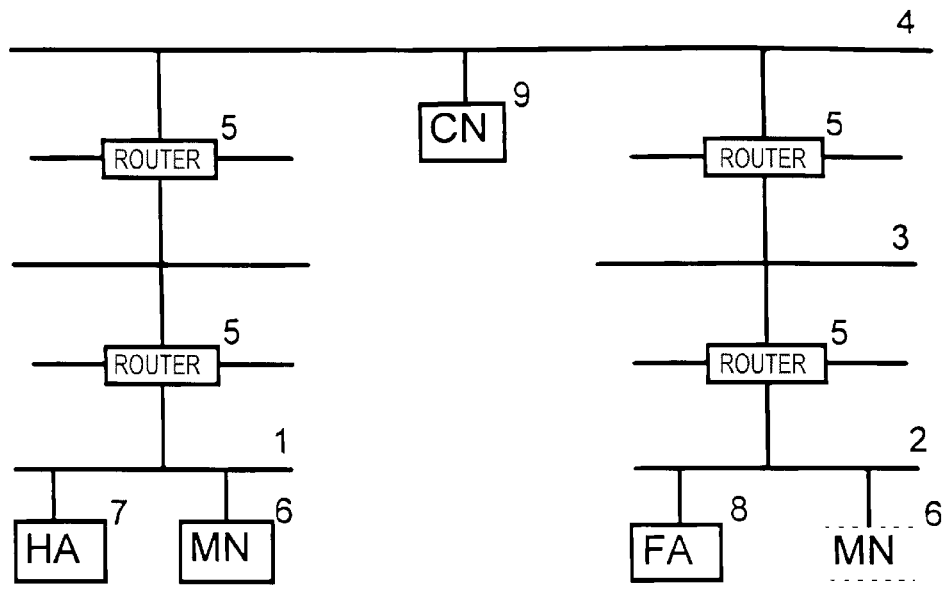
FIG. 1a is a schematic diagram of the general arrangement of a mobile IP based system.
Figure 1B:
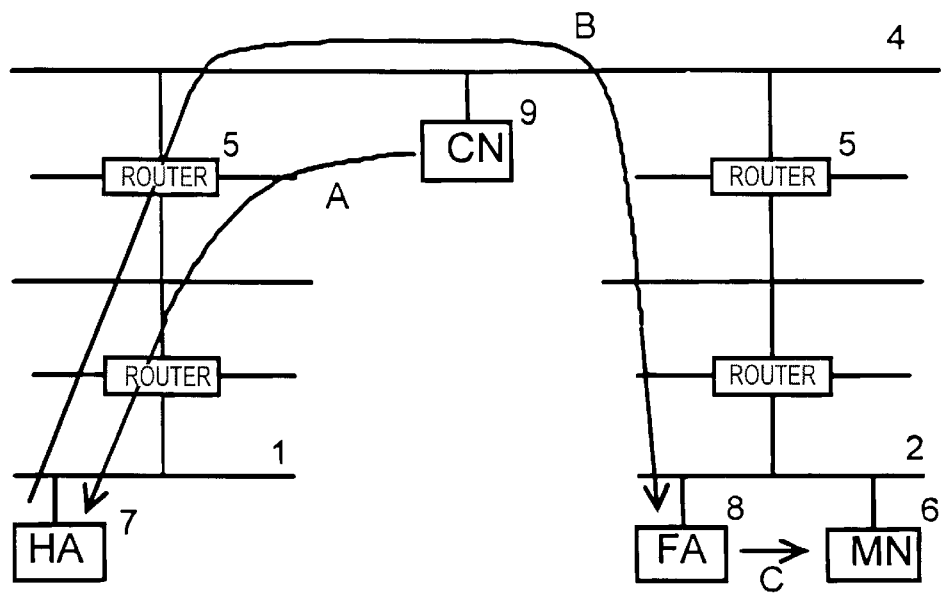
FIG. 1b is the diagram of FIG. 1a showing the flow of data to a mobile node attached to a foreign network.
Figure 2:
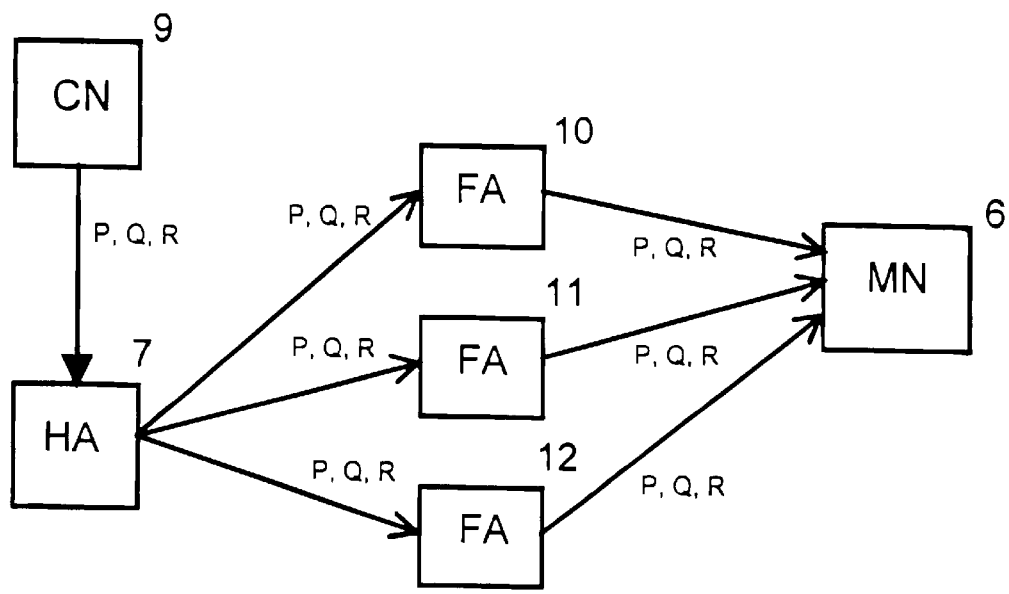
FIG. 2 is a schematic block diagram showing the data flows within a prior art system.

FIG. 2 shows the prior art situation in which the mobile node 6 is within range of three foreign agents 10, 11, 12. When the correspondent node 9 sends a message comprising a sequence of datagrams P, Q, R . . . Z to the mobile node 6, this message is intercepted by the home agent 7. The home agent 7 maintains a record of the current mobility bindings for the mobile node 6, from which it knows the IP addresses of all of the foreign agents 10, is 11, 12 with which the mobile node is registered. As each datagram is received, the home agent 7 produces the requisite number of identical copies of that datagram, in this case three, and encapsulates these with the respective care-of address of the foreign agents.

Each of the three identical copies of the received datagram is encapsulated with respective ones of three IP addresses corresponding to each of the foreign agents 10, 11, 12. The home agent 7 then tunnels the encapsulated datagrams to the respective foreign agents. The foreign agents 10, 11, 12 decapsulate the datagrams and forward the three identical copies of the datagrams to the mobile node 6.

Figure 3A:
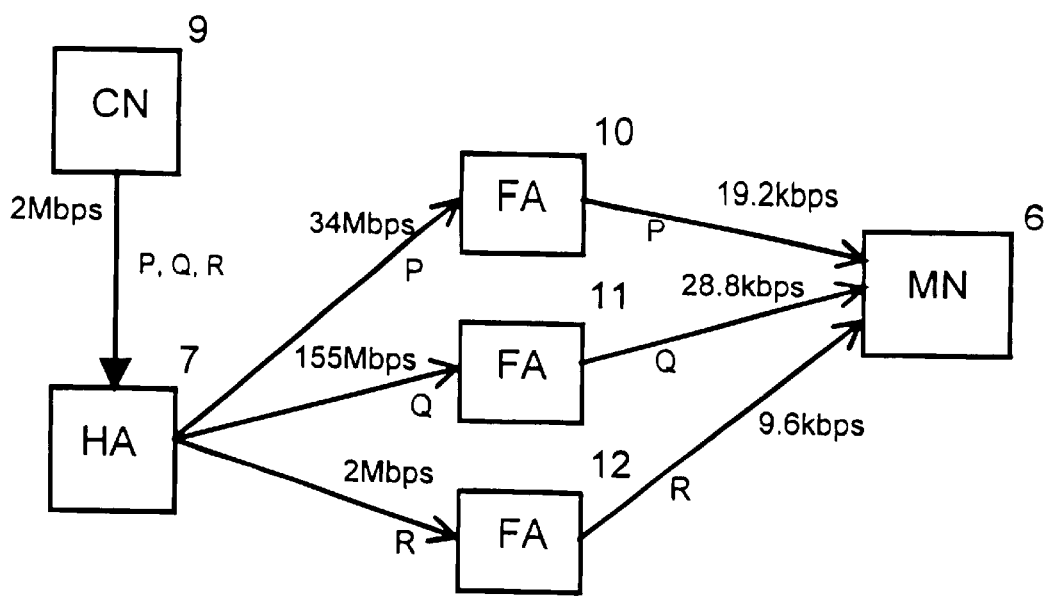
FIG. 3a is a schematic block diagram showing the data flows within a system according to the present invention.
Figure 3B:
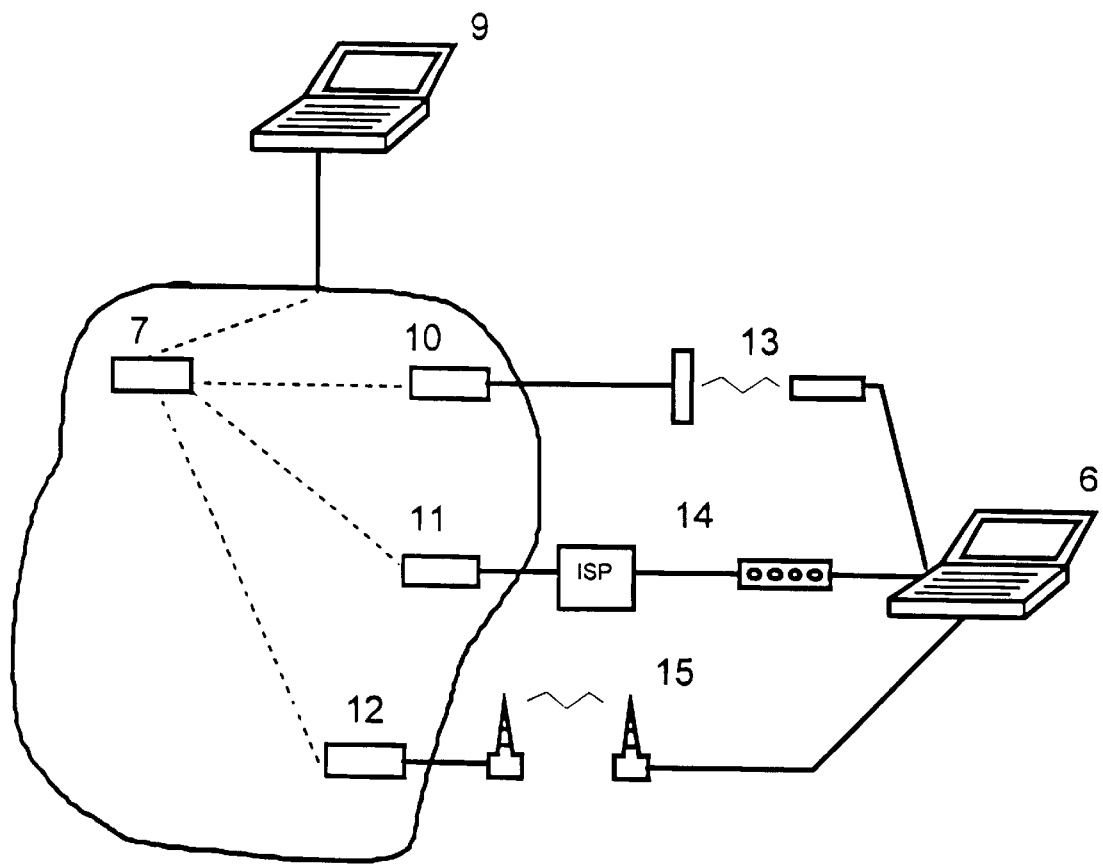

FIG. 3a schematically illustrates the system according to the invention, the figures beside each link indicating an example data transfer capacity for that link. The foreign agents 10, 11, 12 may represent routers connected to ground-based radio stations which maintain a radio link with a mobile computer 6 which is operating in the field disconnected from its home network. Alternatively, referring to FIG. 3b, the foreign agents 10, 11, 12 may represent routers enabling connections over three different media types, for example, respectively, connection 13 to a wireless LAN over an infra-red link, connection 14 to an ISP via a modem and connection 15 to a wireless LAN base station over a radio link.

In a system such as the one illustrated in FIGS. 2 and 3, the lowest capacity links are likely to be those between the foreign agents 10, 11, 12 and the mobile node 6, particularly if these are wireless links. In the prior art transmission scheme, the maximum data rate between the correspondent node 9 and the mobile node 6 is therefore limited by the highest data rate on any one of the foreign agent—mobile node links. Assuming that the data transfer rates shown in FIG. 3a are also applicable to the prior art system of FIG. 2, the maximum data transfer rate in the prior art system is 28.8 kbps, being the data rate between foreign agent 11 and mobile node 6.

Referring to FIG. 3a, in the system according to the invention, the home agent 7 receives a message destined for the mobile node 6 from the correspondent node 9, as before. However, each datagram P, Q, R . . . Z comprised in the message is not copied as it is received; instead it is immediately sent to the next available foreign agent. This may be done on a "round robin" basis, so that the first datagram P is sent to the first foreign agent 10, the second Q is sent to the second foreign agent 11 and the third R is sent to the third foreign agent 12. The fourth datagram S is then sent to the first foreign agent 10 and the process repeats for the remaining datagrams.

As each encapsulated datagram is received by the respective foreign agent, it is then decapsulated and forwarded to the mobile node 6. The correspondent node 9 in FIG. 3a may therefore send data at a composite rate which is the sum of the individual data rates for each of the foreign agent—mobile node links, namely 19.2+28.8+9.6=57.6 kbps, ie. double the rate that is possible with the prior art arrangement in FIG. 2.

If the data rate between correspondent node 9 and home agent 7 exceeds the maximum possible data rate for the system, the resulting rate of data transfer to the mobile node 6 depends on a number of factors, one of the most significant being the underlying Internet protocol which manages the data transfer.

Data transfer within the on a connectionless or connection-oriented basis, depending on the protocol used, which in turn depends on the nature of service which is to be provided over the Internet.

Two of the best known data transport protocols are Transmission Control Protocol (TCP) and User Datagram Protocol (UDP), which are part of the TCP/IP Internet suite which also provides the Internet Protocol (IP). In known systems, TCP/IP is implemented in software, and is normally resident in, and an integral part of, the computer operating system. User access to TCP/UDP through the operating system is comparable to similar processes such as user access to the computer's file system. A variety of TCP/IP implementations are commercially available for different platforms such as DOS and UNIX. For example, Microsoft TCP/IP software is provided as an integral part of the Microsoft Windows 95 and Windows NT operating systems.

UDP provides a connectionless IP datagram delivery service which does not maintain an end-to-end connection between transmitting and receiving nodes and therefore does not guarantee data delivery. It merely treats each datagram as a self-contained entity to be transferred on a best-try approach. It is up-to the application using the UDP service to perform error checking; if it does not do so, it has no way of knowing if a datagram has arrived at the receiver or if it has been lost in transit. This form of transfer is particularly suitable for some types of data, for example image or voice data, where speed may be more important than occasional errors, which are unlikely to substantially affect the received image or speech quality.

However, for many applications, a reliable connection-oriented service is required, which guarantees IP datagramn delivery. TCP is a connection-oriented protocol which maintains an end-to-end connection between transmitting and receiving nodes, and provides a reliable and secure logical connection for data transfer between the nodes.

TCP assumes that it can obtain a simple but potentially unreliable data service from the IP protocol layer. To turn this into a reliable service, it therefore has to provide a range of functions including (a) basic data transfer, (b) reliability and error correction, allowing recovery from damaged or missing data or data delivered out of sequence, and (c) flow control, which provides the receiving node with the means to govern the amount of data sent by the transmitting node. The TCP specification setting out the detailed requirements for implementation in each of these areas is available as RFC 793.

The system according to the present invention is particularly suited to UDP based tasks such as the transmission of image and voice data and will generate a significantly better data transfer rate as compared with the prior art system. If the maximum transfer rate over the foreign agent—mobile node links is insufficient to cope with the transfer rate between correspondent node 9 and home agent 7, UDP does not perform any form of flow control and simply drops data packets which exceed existing buffer capacities. It is therefore necessary to provide separate error checking facilities.

If the service being provided requires the use of TCP, a number of factors operate to produce a reliable, connection-oriented transfer. Since data is transferred over three separate links operating at different data rates, sequence control seeks to ensure that the datagrams arrives in the correct order. If the maximum data rate over the foreign agent—mobile node links is insufficient to cope with the transfer rate between correspondent node 9 and home agent 7, TCP receives information concerning undelivered or delayed datagrams. It acts on this information by decreasing the transfer rate on the correspondent node—home agent link so as to match the transfer rate on that link to the aggregate rate available over the foreign agent—mobile node links. However, the result of the various factors which interact to produce overall TCP control is that it is difficult to predict the actual overall transfer rate, other than to say that this is likely to be better than the overall rate achievable with the prior art system. So, referring to FIG. 3a, the maximum available data rate in a TCP based system is likely to lie somewhere between 28.8 kbps and 57.6 kbps.

In a practical system, the bandwidth of the foreign agent—mobile node links is difficult to predict, so to achieve optimal performance, modifications or alternatives to the round-robin algorithm can be used. In particular, before allocating a datagram to a particular foreign agent—mobile node link, it is desirable to determine whether the foreign agent is available, or to check the available bandwidth across the link. This can be done by, for example, checking the level of buffer use at each of the foreign agent routers. Checking the quality of the connection, and re-routing the datagram if the quality does not meet some predetermined criterion, such as a minimum bandwidth, helps to limit the possibility that a very low bandwidth foreign agent—mobile node link will become a new bottleneck in the data transfer process.

Mobile IP provides mechanisms for the mobile node to maintain its registrations, periodically checking for new foreign agents or that an already registered agent is no longer reachable. When the mobile node comes within range of further foreign agents, new registrations are initiated and datagrams may then be sent to those agents, so further increasing the potential data transfer rate. Similarly, when a foreign agent is no longer within range of the mobile node, the foreign agent will be de-registered and the incoming datagrams may be divided between the remaining agents.

Although the above examples have been described with reference to the Internet, the invention is applicable to any network based on the Internet Protocol and the principles may be extended to systems based on other network protocols.

What is claimed is:

1. A method of routing data from a home agent of a home communications network to a mobile node associated with the home communications network but currently connected to a foreign communications network away from the home communications network, the method comprising:

determining the location of a plurality of foreign agent nodes associated with the foreign communications network from which data may be transmitted to the mobile node; and transmitting from the home agent successive data units from a received stream of data units intended for the mobile node to different respective ones of the foreign agent nodes.

2. A method according to claim 1, wherein next successive ones of the data units are transmitted to the foreign agent nodes on a round-robin basis.

3. A method according to claim 1, further comprising assessing the quality of the connection between each foreign agent node and the mobile node prior to transmitting a data unit to the foreign agent node.

4. A method according to claim 3, including re-routing the data unit to a different one of the foreign agent nodes if the connection quality does not meet predetermined criteria.

5. A method according to claim 4, wherein the predetermined criteria include a minimum bandwidth for the connection between one of the foreign agent nodes and the mobile node.

6. A method according to claim 3, wherein the available bandwidth for data transfer across the connection is a measure of the quality of the connection.

7. A method according to claim 3, wherein the foreign agent nodes include data buffers and the level of buffer use is a measure of the quality of the connection.

8. A method according to claim 1, wherein each data unit is an encapsulated IP datagram.

9. A method of routing data to a mobile node within a communications network, comprising:

determining the location of a location of a plurality of agent nodes from which data may be transmitted to the mobile node; and transmitting successive data units from a stream of data units intended for the mobile node to different respective ones of the agent nodes;

wherein the agent nodes are foreign agents within a Mobile IP based network.

10. A communications system for mobile data transfer comprising:

a mobile node connectable to a foreign network away from its home network;

a home agent node associated with the home network for receiving a stream of data units intended for the mobile node; and a plurality of foreign agent nodes associated with the foreign network for forwarding data units received from the home agent node to the mobile node;

wherein the home agent node is configured to transmit different data units from the received stream of data units to different respective ones of the foreign agent nodes.

11. A communications system according to claim 10, wherein successive ones of the different data units are transmitted to the different agent nodes on a round-robin basis.

12. A communications system for mobile data transfer, the system comprising:

a correspondent node;

a mobile node;

a first agent node and a second agent node for respectively receiving successive ones of data units transmitted from the correspondent node, the first agent node having a first individual data transfer rate to the mobile node and the second agent node having a second individual data transfer rate to the mobile node;

wherein the correspondent node is capable of transferring data to the mobile node at a composite data transfer rate which is the sum of the first and second individual data transfer rates.

13. A system according to claim 12, wherein successive ones of data units transmitted from the correspondent node to the first and second agent nodes are done so on a round-robin basis.

14. A method of transmitting successive data units from a stream of data units from a correspondent node of a home communications network to a mobile node through different respective ones of foreign agent nodes, wherein each of the foreign agent nodes is capable of transferring data to the mobile node at a respective individual data transfer rate, the mobile node being associated with the home communications network but currently connected to a foreign communications network away from the home communications network, wherein the method comprises:

transmitting from the correspondent node successive data units from a stream of data units to the mobile node using different respective ones of the foreign agent nodes associated with the foreign network at an aggregate data transfer rate, the aggregate data transfer rate being the sum of the individual data transfer rates.

15. A method according to claim 14, wherein successive ones of the data units are transmitted.to the different foreign agent nodes on a round-robin basis.

16. A communications system for mobile data transfer, the system comprising:

a correspondent node of a home communications network;

a mobile node associated with the home communications network but currently connected to a foreign communications network away from the home communications network; and a plurality of foreign agent nodes associated with the foreign communications network for respectively receiving successive ones of data units transmitted from the correspondent node, each of the foreign agent nodes being capable of transferring data to the mobile node at a respective individual transfer rate;

wherein the correspondent node is capable of transferring data to the mobile node at a composite data transfer rate which is the sum of the individual data transfer rates.

17. A system according to claim 16, wherein successive ones of the data units transmitted from the correspondent node to the respective foreign agent nodes are done so on a round-robin basis.

* * * * *